(No Model.)
T. BRABSON.
BRIDLE BIT.
No. 274,709. Patented Mar. 27, 1883.
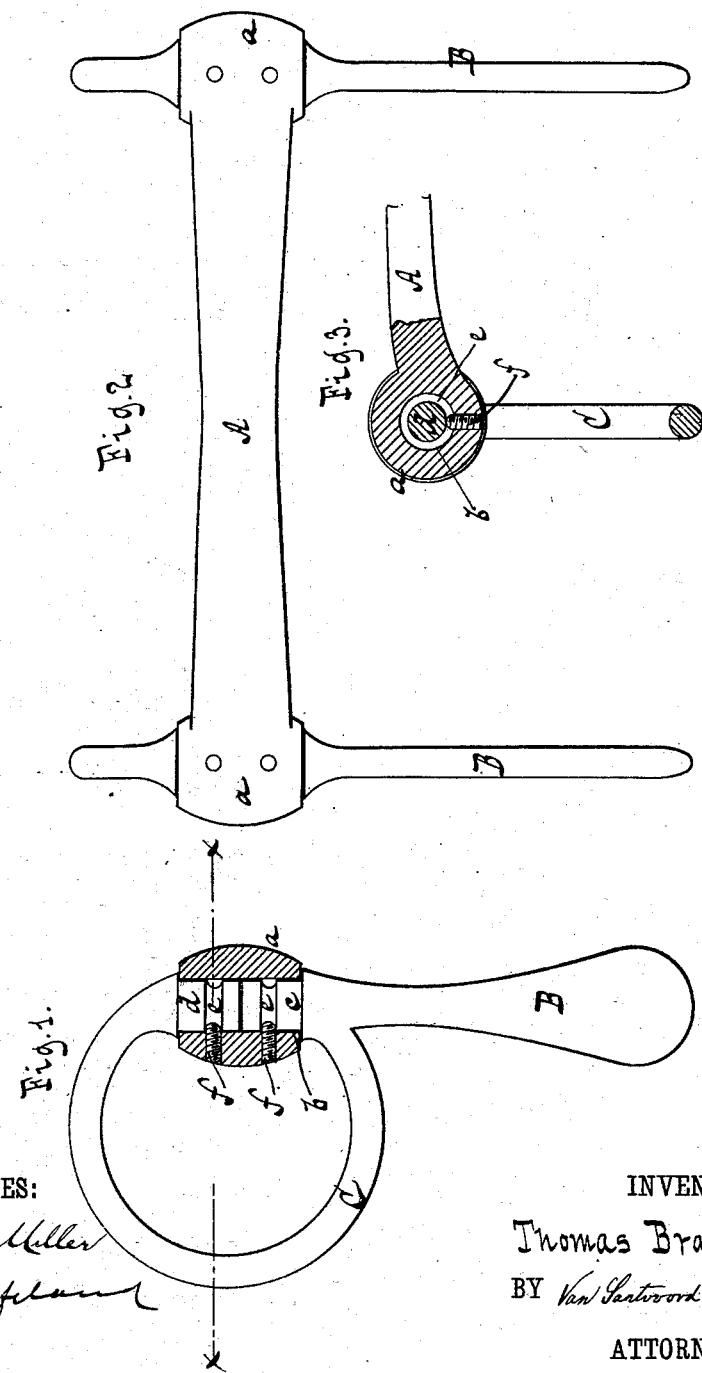
WITNESSES:
INVENTOR
Thomas Brabson
BY Van Santvoord & Hauff
ATTORNEYS

UNITED STATES PATENT OFFICE.

THOMAS BRABSON, OF NEWARK, NEW JERSEY.

BRIDLE-BIT.

SPECIFICATION forming part of Letters Patent No. 274,709, dated March 27, 1883.

Application filed January 24, 1883. (No model.)

*To all whom it may concern:*

Be it known that I, THOMAS BRABSON, a citizen of the United States, residing at Newark, in the county of Essex and State of New Jersey, have invented new and useful Improvements in Bridle-Bits, of which the following is a specification.

This invention relates to a novel means for uniting the cheek-pieces or the rings with the mouth-piece of a bridle-bit. The peculiar construction of my bridle-bit is pointed out in the following specification and illustrated in the accompanying drawings, in which—

Figure 1 represents a sectional end view. Fig. 2 is a plan or top view. Fig. 3 is a section in the plane $x\ x$, Fig. 1.

Similar letters indicate corresponding parts.

In the drawings, the letter A designates the mouth-piece of my bridle-bit. At each end of this mouth-piece is formed a head, $a$, which is bored out to form a socket, $b$.

B B are the cheek-pieces. Each of these cheek-pieces is provided with a ring, C, and with a projection or nipple, $c$. Each of these rings C is formed of a bar, which is by preference cast solid with its cheek-piece, and provided at its end with a nipple, $d$, equal in diameter to the nipple $c$ on the cheek-piece. When the bar has been bent to form the ring C the nipple $d$ is brought in line with the nipple $c$, and then it is sprung into the socket $b$ of the mouth-piece, as shown in Fig. 1. Each of the nipples is provided with a circular groove, $e$, and in the head $a$ of the mouth-piece are secured two screws, $f$, the points of which engage with the grooves $e$, thus swiveling the nipples in the socket $b$. By these means the cheek-pieces or the rings can turn freely in the socket $b$, and by the screws $f$ and grooves $e$ the nipples $c\ d$ are retained in the socket, so that the rings C cannot spread open and are not liable to become detached from the mouth-piece.

The mouth-piece, as well as the cheek-pieces, together with the bars required for forming the rings C, can be easily cast, and after the various holes have been bored into the heads of the mouth-piece and the nipples $c\ d$ have been formed on the cheek-pieces each part can be readily finished and polished before the same are joined together, and when the parts have been joined a firm, durable, and handsome bridle-bit is obtained at a comparatively low price.

In the example represented by the drawings I have shown a bit with cheek-pieces; but my invention is applicable to ordinary ring-bits without cheek-pieces. In this case the nipples $c\ d$ are formed at the ends of the cheek-rings C.

I am aware that the mouth-piece of a bit has been provided at its ends with sockets in which the shanks of cheek-pieces are secured in a stationary position by pouring melted metal into the sockets.

What I claim as new, and desire to secure by Letters Patent, is—

1. The combination, with the mouth-piece A, having sockets $b$ at its ends, of rings C, provided with nipples $c\ d$, swiveled in the sockets, substantially as described.

2. The combination, substantially as hereinbefore described, of the mouth-piece A, provided at its ends with sockets $b$, the rings C, provided with two grooved nipples, $c\ d$, fitting the sockets $b$, and the screws $f$, engaging with grooves in the nipples.

In testimony whereof I have hereunto set my hand and seal in the presence of two subscribing witnesses.

THOMAS BRABSON. [L. S.]

Witnesses:
  W. HAUFF,
  E. F. KASTENHUBER.